United States Patent

Wang et al.

(10) Patent No.: US 11,290,866 B2
(45) Date of Patent: Mar. 29, 2022

(54) REAL-TIME LIGHTWEIGHT NAT KEEP-ALIVE INTERVAL OPTIMIZATION FOR MULTI-SIM MOBILE DEVICES

(71) Applicant: Samsung Electronics Co., Ltd., Suwon-si (KR)

(72) Inventors: Shu Wang, Allen, TX (US); Mohan Reddy Duggi, Basking Ridge, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 16/994,305

(22) Filed: Aug. 14, 2020

(65) Prior Publication Data

US 2022/0053315 A1   Feb. 17, 2022

(51) Int. Cl.
| | |
|---|---|
| *H04L 29/12* | (2006.01) |
| *H04W 8/18* | (2009.01) |
| *H04W 76/10* | (2018.01) |
| *H04L 61/256* | (2022.01) |

(52) U.S. Cl.
CPC ............ *H04W 8/18* (2013.01); *H04L 61/256* (2013.01); *H04W 76/10* (2018.02)

(58) Field of Classification Search
CPC ........ H04W 8/18; H04W 76/10; H04L 61/256
See application file for complete search history.

(56) References Cited

U.S. PATENT DOCUMENTS

| | | |
|---|---|---|
| 8,369,895 B2 | 2/2013 | Lee et al. |
| 8,892,710 B2 | 11/2014 | Gatta et al. |
| 9,794,109 B2 | 10/2017 | McKinney et al. |
| 10,440,593 B2 | 10/2019 | Gonzalez et al. |
| 2010/0279698 A1 | 11/2010 | Wong |
| 2011/0002339 A1* | 1/2011 | Fok ...................... H04L 63/0236 370/401 |
| 2011/0077031 A1 | 3/2011 | Kim et al. |
| 2013/0246641 A1* | 9/2013 | Vimpari .................. H04L 47/10 709/228 |

(Continued)

FOREIGN PATENT DOCUMENTS

CN        111031598 A        4/2020

OTHER PUBLICATIONS

International Search Report and Written Opinion of the International Searching Authority dated Jun. 21, 2021 in connection with International Patent Application No. PCT/KR2021/003198, 7 pages.

*Primary Examiner* — Joseph E Dean, Jr.

(57) ABSTRACT

A method includes setting, using at least one processor of an electronic device that includes multiple subscriber identity module (SIM) cards, a maximum Network Address Translation (NAT) interval to be a maximum value among NAT keep-alive intervals associated with the multiple SIM cards. The method also includes triggering, using the at least one processor, a partial call setup from a first SIM card of the multiple SIM cards to a second SIM card of the multiple SIM cards. The method further includes determining, using the at least one processor, whether the electronic device receives the partial call setup. In addition, the method includes, in response to determining that the electronic device receives the partial call setup, setting, using the at least one processor, the NAT keep-alive interval for each of the multiple SIM cards to be equal to the maximum NAT interval.

20 Claims, 6 Drawing Sheets

(56) References Cited

U.S. PATENT DOCUMENTS

| | | |
|---|---|---|
| 2015/0281926 A1 | 10/2015 | Liu et al. |
| 2016/0142998 A1 | 5/2016 | Tsai et al. |
| 2017/0367125 A1* | 12/2017 | Krishnamoorthy ......................... H04W 36/0022 |
| 2021/0235515 A1* | 7/2021 | Muthurajan .......... H04W 8/205 |

* cited by examiner

REAL-TIME LIGHTWEIGHT NAT KEEP-ALIVE INTERVAL OPTIMIZATION FOR MULTI-SIM MOBILE DEVICES

TECHNICAL FIELD

This disclosure relates generally to wireless communication devices. More specifically, this disclosure relates to real-time lightweight Network Address Translation (NAT) keep-alive interval optimization for multi-SIM mobile devices.

BACKGROUND

Network Address Translation (NAT) is a technique for remapping an Internet Protocol (IP) address into another address format by modifying network address information in the IP header of packets while they are in transit across a traffic routing device. In a Long Term Evolution (LTE) network, for example, an Access Point Name (APN) network identifier defines a Packet Data Network (PDN) to which a wireless device (also referred to as user equipment or "UE") requests connectivity. Some applications, such as Voice over WIFI (VoWIFI), push-to-talk over WIFI, and the like, use an always-on or long-lived APN connection between the UE and a network evolved Packet Data Gateway (ePDG) server. To maintain the persistent APN connection, the UE may need to send periodic NAT keep-alive messages over WIFI.

SUMMARY

This disclosure provides for real-time lightweight Network Address Translation (NAT) keep-alive interval optimization for multi-SIM mobile devices.

In a first embodiment, a method includes setting, using at least one processor of an electronic device that includes multiple subscriber identity module (SIM) cards, a maximum NAT interval to be a maximum value among NAT keep-alive intervals associated with the multiple SIM cards. The method also includes triggering, using the at least one processor, a partial call setup from a first SIM card of the multiple SIM cards to a second SIM card of the multiple SIM cards. The method further includes determining, using the at least one processor, whether the electronic device receives the partial call setup. In addition, the method includes, in response to determining that the electronic device receives the partial call setup, setting, using the at least one processor, the NAT keep-alive interval for each of the multiple SIM cards to be equal to the maximum NAT interval.

In a second embodiment, an electronic device includes at least one memory configured to store instructions. The electronic device also includes at least one processing device configured when executing the instructions to set a maximum NAT interval to be a maximum value among NAT keep-alive intervals associated with multiple SIM cards of the electronic device. The at least one processing device is also configured when executing the instructions to trigger a partial call setup from a first SIM card of the multiple SIM cards to a second SIM card of the multiple SIM cards. The at least one processing device is further configured when executing the instructions to determine whether the electronic device receives the partial call setup. In addition, the at least one processing device is configured when executing the instructions, in response to determining that the electronic device receives the partial call setup, to set the NAT keep-alive interval for each of the multiple SIM cards to be equal to the maximum NAT interval.

In a third embodiment, a non-transitory machine-readable medium contains instructions that when executed cause at least one processor of an electronic device to set a maximum NAT interval to be a maximum value among NAT keep-alive intervals associated with multiple SIM cards of the electronic device. The medium also contains instructions that when executed cause the at least one processor to trigger a partial call setup from a first SIM card of the multiple SIM cards to a second SIM card of the multiple SIM cards. The medium further contains instructions that when executed cause the at least one processor to determine whether the electronic device receives the partial call setup. In addition, the medium contains instructions that when executed cause the at least one processor, in response to determining that the electronic device receives the partial call setup, to set the NAT keep-alive interval for each of the multiple SIM cards to be equal to the maximum NAT interval.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, Network Address Translation (NAT) is a technique for remapping an Internet Protocol (IP) address into another address format by modifying network address information in the IP header of packets while they are in transit across a traffic routing device. One common use of NAT is for mapping private IP addresses to public IP addresses (such as globally unique public IP addresses) and vice visa. Private IP addresses can be used within a private network. However, data connections directly into the Internet typically have a public IP address. Thus, when a device prepares to access the Internet, it may be necessary or desirable to map a private IP address to a public IP address. In the case of IP version 4 (IPv4), NAT is used because of a shortage of IPv4 addresses. NAT can support the mapping in the form of:

<private src ipaddress: private src portId-public src ipaddress: public src portId> which can be used to map private IP address and port values to public IP address and port values (and vice visa). In some systems, a NAT translation table can be used to store the mapping information.

In a Long Term Evolution (LTE) network, an Access Point Name (APN) network identifier defines a Packet Data Network (PDN) to which a user equipment (UE) requests connectivity. The PDNs are usually supported by an operator, such as an IP Multimedia System (IMS) PDN, an administrator PDN, an Internet PDN, a content filtering PDN, an application PDN, and the like. Each PDN may provide a different type of service to the UE. For example, the IMS PDN provides voice call- and video call-related services.

Some applications, such as Voice over WIFI (VoWIFI), push-to-talk over WIFI, and the like, use an always-on or long-lived APN connection between the UE and a network evolved Packet Data Gateway (ePDG) server. To maintain the persistent APN connection, the UE may need to send periodic NAT keep-alive messages over WIFI.

If a UE connects to a WIFI access point (AP), the UE usually receives a private IPv4 address assigned from the WIFI AP. NAT mapping can be used in the WIFI AP router to support the addressing. For an always-on APN or long-lived APN connection, the NAT mapping for these APNs at the WIFI AP routers should exist at all times. However, NAT mapping entries in a WIFI AP router are typically subject to a timeout function. If a connection has been unused for a predetermined length of time, the associated NAT mapping entry may be removed from the table. The connection state timeout values vary from product to product, but typical values are in a range of 30 seconds to 180 seconds for User Datagram Protocol (UDP). To prevent the timeout, the UE sends periodic dummy NAT "keep-alive" packets to each APN to reset the timers in the WIFI AP router and preserve reachability. If the UE is idle and stops sending periodic NAT keep-alive packets, the related NAT mapping entry is dropped at the WIFI AP router, and the ePDG server is not able to reach the UE. As an example, for an IP Multimedia Subsystem (IMS) APN supporting VoWIFI, an incoming VoWIFI call will not be able to reach the UE over IMS APN from the ePDG server.

The sending of periodic NAT keep-alive packets is power consuming for UEs, especially for dual-SIM or other multi-SIM devices. If the UE has to maintain sending NAT keep-alive packets for a long time (such as at the default interval of twenty seconds), a significant amount of UE battery power can be consumed. For dual-SIM or other multi-SIM devices, there are multiple APNs that correspond to each SIM card (such as IMS APN1, . . . , APN1n on SIM1, IMS APN2, . . . , APN2n on SIM2, etc.). This results in even greater power consumption at the UE.

There is currently no effective real-time lightweight NAT keep-alive interval optimization technique for mobile devices. One optimization technique is a test connection-based NAT optimization in which the mobile device sets up an extra test APN connection to the ePDG server. On the test connection, the mobile device experiments to determine an optimized NAT keep-alive interval $NAT_{test}$. One disadvantage of this technique is the need to set up an extra test APN to the ePDG server, which causes additional overhead to the network side. Also, not all networks support a test APN connection to the ePDG server. If a network does not support a test APN, this technique has limited or no applicability.

Another optimization technique is Port Control Protocol (PCP)-based NAT optimization. In PCP-based NAT optimization, a type of NAT mapping called "explicit dynamic mapping" requires that both a client side (such as the mobile device) and a server side (such as the WIFI AP router) support the PCP protocol. The client can explicitly request for the desired NAT lifetime (thus not an implicit dynamic mapping) as long as all NATs on the path support PCP. When the NAT lifetime is to be expired, the client can request a lifetime extension via PCP. One disadvantage of this technique is that not all WIFI APs support PCP, and mobile devices may often connect to a WIFI AP router that does not support PCP. Thus, this technique is not applicable in many cases.

For at least these reasons, many current mobile devices are pre-programmed with a fixed NAT keep-alive interval value. The value is programmed according to a requirement of the network operator. For example, among some North American operators, the NAT keep-alive interval requirement for each APN can range from 20 seconds to 120 seconds.

Dual-SIM or other multi-SIM devices in particular need a more efficient method for optimizing the NAT keep-alive interval. Consider a dual-SIM based UE that connects to a WIFI AP. As an example, the UE may be a dual-SIM, dual stand-by device with a SIM card for a first operator and a SIM card for a second operator. In this example, it is assumed that the WIFI AP router has a configured NAT timeout value equal to 70 seconds. For the sake of this example, it is assumed that the first operator has a NAT keep-alive interval of 20 seconds, and the second operator has a NAT keep-alive interval of 60 seconds. To maintain an always-on IMS APN on the SIM for the first operator, the UE sends a NAT keep-alive message every 20 seconds. To maintain an always-on IMS APN on the SIM for the second operator, the UE sends a NAT keep-alive message every 60 seconds. However, the current WIFI AP NAT timeout value is 70 seconds, which is a longer interval than the 20-second or 60-second intervals specified by the operators. This means that the UE sends frequent, unnecessary NAT keep-alive messages and consumes unnecessary power. Thus, it would be beneficial for the UE to optimize the NAT keep-alive interval in real-time when connecting to a WIFI AP router.

To address these and other issues, this disclosure provides a system and method for real-time lightweight optimization of a NAT keep-alive interval for multi-SIM mobile devices. Using the disclosed embodiments, an electronic device (such as a UE) can determine an optimized NAT keep-alive interval by triggering a partial call between multiple SIMs. Once the electronic device determines the optimized NAT keep-alive interval, the electronic device can set the NAT keep-alive interval on all SIMs to be the optimized NAT keep-alive interval. Among other things, this can reduce power consumption and reduce the number of NAT keep-alive messages transmitted by the electronic device.

Figure 1:
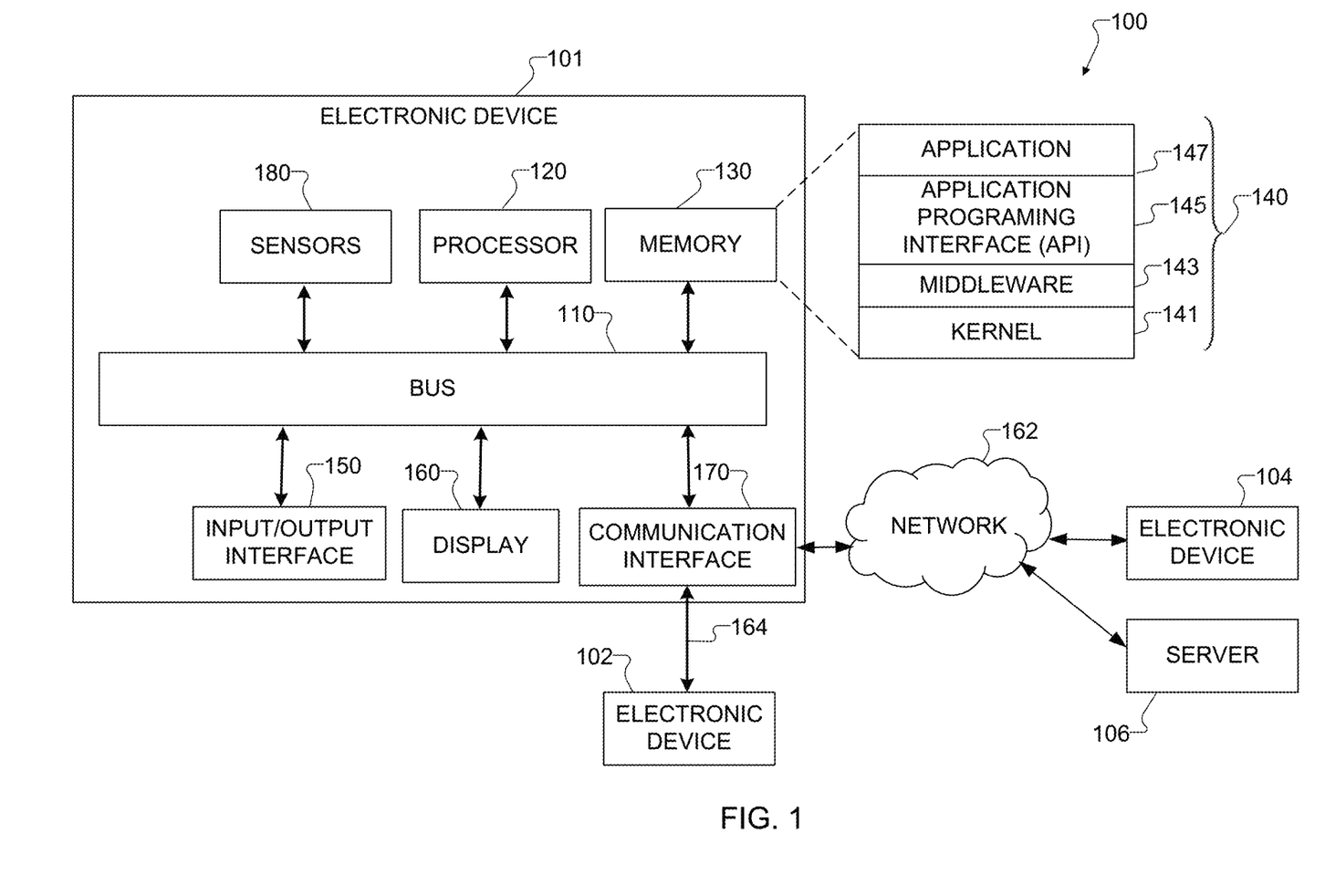
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can perform operations associated with real-time lightweight optimization of a NAT keep-alive interval for the electronic device 101, which (as described below) represents a multi-SIM device.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
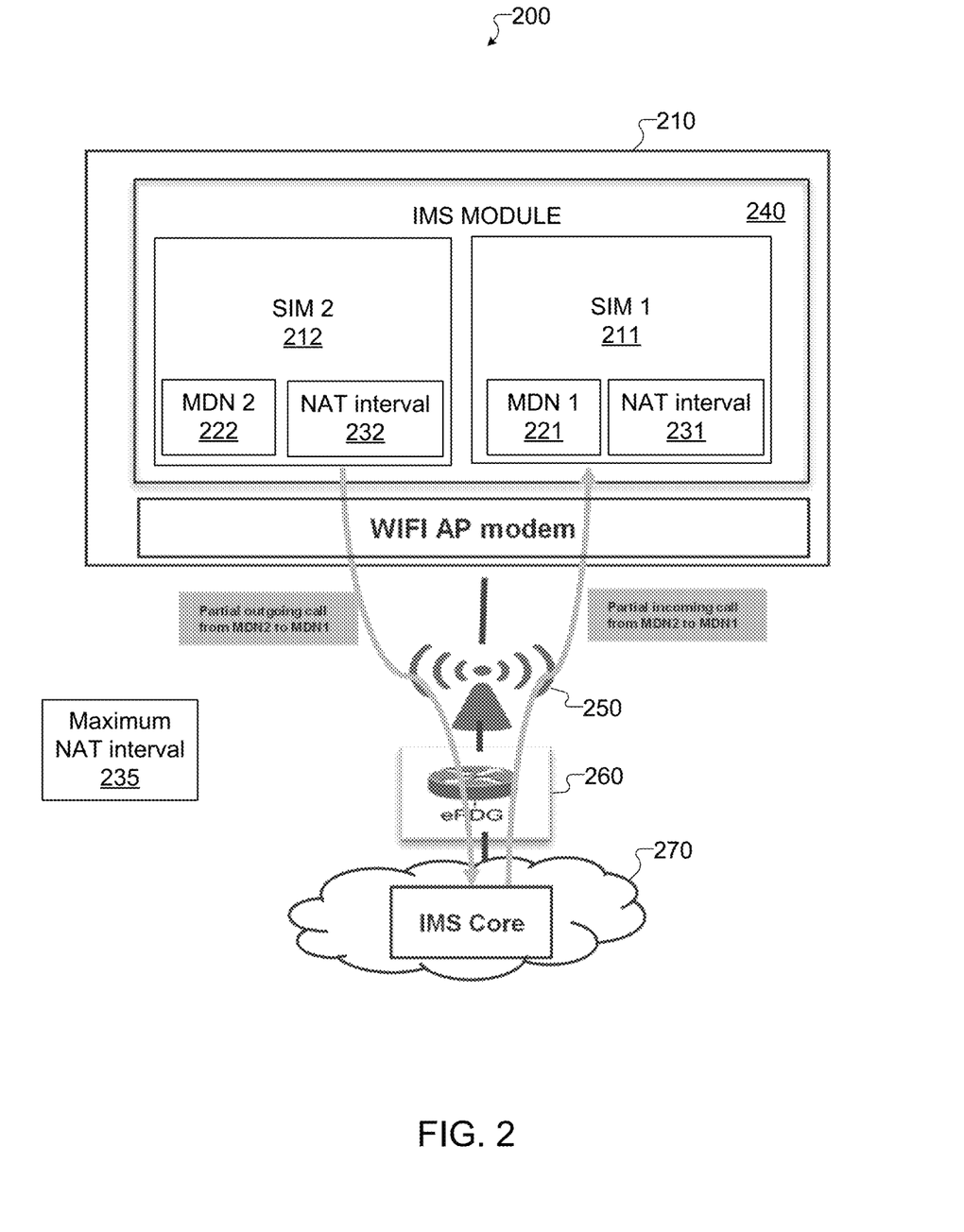
FIG. 2 illustrates an example system in which real-time lightweight optimization of a NAT keep-alive interval for multi-SIM mobile devices can be performed according to this disclosure.

FIG. 2 illustrates an example system 200 in which real-time lightweight optimization of a NAT keep-alive interval for multi-SIM mobile devices can be performed according to this disclosure. For ease of explanation, the system 200 is described as involving some of the components of the network configuration 100 shown in FIG. 1. However, the system 200 could be implemented using any other suitable device(s) in any other suitable system(s).

As shown in FIG. 2, the system 200 includes a UE 210, which may represent or include the various components of the electronic device 101. The UE 210 communicates with a network 270 via a WIFI AP router 250 and an ePDG server 260. The UE 210 here represents a dual-SIM mobile device that includes a first SIM 211 and a second SIM 212. Each SIM 211-212 is associated with a mobile directory number (MDN) 221-222. For example, the SIM 211 is associated with the MDN 221, and the SIM 212 is associated with the MDN 222. The UE 210 supports VoWIFI, and includes a common ePDG/IMS module (or simply "IMS module") 240 to handle the VoWIFI calls for both SIMs 211-212.

Consistent with mobile devices that support VoWIFI, the IMS APN for each SIM 211-212 supports VoWIFI calls and is an always-on APN. Thus, the NAT entries for the IMS APNs on the WIFI AP router 250 should be maintained at all times. In some situations, it is possible that the NAT entries are removed when the IMS APN idle time becomes greater than the WIFI AP NAT timeout configuration, which may occur when the NAT keep-alive interval on the UE 210 is too long. When that happens, incoming calls are not able to be routed from the WIFI AP router 250 to the UE 210 since the WIFI AP router 250 no longer has the NAT entry to map the public IP address of the UE 210 to the corresponding private IP address of the UE 210.

The IMS module 240 can configure different NAT keep-alive intervals (or "NAT intervals" for short) for the SIM 211 and the SIM 212 per operator requirements. For example, the IMS module 240 can configure a NAT interval 231 for the SIM 211 and a NAT interval 232 for the SIM 212. When the UE 210 connects to the WIFI AP router 250 and the NAT intervals 231-232 are different, this could cause the UE 210 to send excessive NAT keep-alive messages as described above. However, the UE 210 can take steps to avoid sending excessive NAT keep-alive messages according to the following.

The UE 210 first checks if the larger of the two NAT intervals 231-232 is an effective NAT interval for the WIFI AP router 250. For illustration purposes, it is assumed that the NAT interval 231 is larger than the NAT interval 232. The UE sets a maximum NAT interval 235 to be equal to the NAT interval 231.

To determine if the maximum NAT interval 235 is effective, the UE 210 checks if the SIM 211 can receive an incoming call after its idle period reaches the maximum NAT interval 235. To test this, the IMS module 240 triggers a partial call setup from the SIM 212 to the SIM 211 in order to check if the SIM 211 can receive an incoming call after its idle period reaches the maximum NAT interval 235. For example, the IMS module 240 may send a Session Initiation Protocol (SIP) Invite message to trigger an outgoing VoWIFI call setup from the MDN 222 to the MDN 221 after the SIM 211 idle time reaches the maximum NAT interval 235. The SIP Invite message includes identifiers for both the call-initiating MDN 222 and the call-receiving MDN 221. The MDN identification information enables correct routing of the SIP Invite message. Since the IMS module 240 handles both incoming and outgoing calls for both SIMs 211-212, the incoming test call setup message (from the MDN 222 to the MDN 221) will come back to the IMS module 240 if the WIFI AP router 250 has a valid NAT entry for the IMS APN for the SIM 211. It is noted that the IMS module 240 handles the partial call internally, so evidence of the partial call is not shown on the display of the UE 210 (meaning the user is not aware that the partial call occurs).

The IMS module 240 determines if the IMS module 240 receives the SIP Invite message of the partial call from the SIM 212 to the SIM 211. If the SIP Invite message is received, the maximum NAT interval 235 is an effective NAT interval for the WIFI AP router 250. In this case, the UE 210 sets both NAT intervals 231-232 to be equal to the maximum NAT interval 235. However, if the maximum NAT interval 235 is not effective and the IMS module 240 does not receive the SIP Invite message of the partial call from the SIM 212 to the SIM 211, the UE 210 reduces its maximum NAT interval 235 by a specified delta amount (such as MAX_NAT_Interval=MAX_NAT_Interval−delta). Depending on the embodiment, delta may be about two seconds, although other values of delta are possible. The UE 210 then determines if the newly-reduced maximum NAT interval 235 is an effective interval by the IMS module 240 by again sending and attempting to receive a SIP Invite message from the SIM 212 to the SIM 211. This process is repeated until the UE 210 determines an effective NAT interval.

It is noted that the IMS module 240 only needs to send out the first call setup message (the SIP Invite message from the MDN 222 to the MDN 221) for testing NAT interval validity. All other call setup SIP messages are not needed, which provides a lightweight testing technique. This technique can optimize the NAT keep-alive interval in real-time and can be supported in any multi-SIM VoWIFI-supported device. In addition, the technique does not require any extra network support. For example, the UE 210 does not need the network 270 to support a test APN or extra PCP protocol.

Although FIG. 2 illustrates one example of a system 200 in which real-time lightweight optimization of a NAT keep-alive interval for multi-SIM mobile devices can be performed, various changes may be made to FIG. 2. For example, while the UE 210 is described as a dual-SIM mobile device, the UE 210 could represent any multi-SIM mobile device with two or more SIMs. Also, various operations described in FIG. 2 could overlap, occur in parallel, occur in a different order, or occur any number of times. In addition, the system 200 could include any number of each component in any suitable arrangement. In general, computing and communication devices come in a wide variety of configurations, and FIG. 2 does not limit the scope of this disclosure to any particular configuration.

Figure 3:
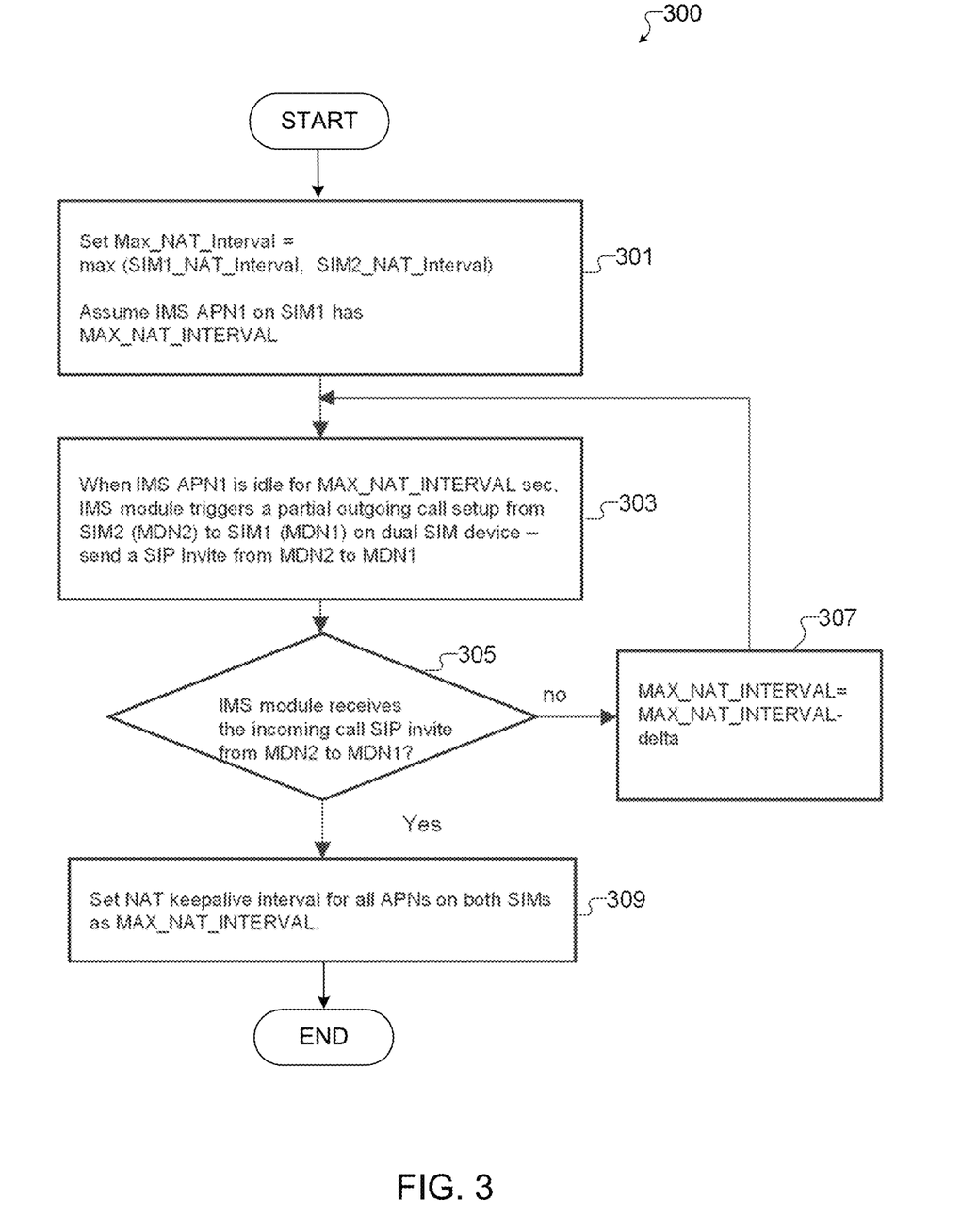
FIG. 3 illustrates an example process for real-time lightweight optimization of a NAT keep-alive interval for a dual-SIM mobile device according to this disclosure.

FIG. 3 illustrates an example process 300 for real-time lightweight optimization of a NAT keep-alive interval for a dual-SIM mobile device according to this disclosure. For ease of explanation, the process 300 shown in FIG. 3 is described as involving the system 200 shown in FIG. 2, which can include the electronic device 101 shown in FIG. 1. However, the process 300 shown in FIG. 3 could be used with any other suitable electronic device and in any suitable system.

In the process 300, it is assumed that the UE 210 has two SIMs 211-212 and supports VoWIFI on both SIMs 211-212. The following labels are used for the process 300:
SIM1_NAT_Interval: NAT interval 231 for SIM 211
SIM2_NAT_Interval: NAT interval 232 for SIM 212
It is also assumed that SIM1_NAT_Interval is not equal to SIM2_NAT_Interval. As an example, SIM1_NAT_Interval may be 60 seconds, and SIM2_NAT_Interval may be 20 seconds. Of course, other values are possible.

As shown in FIG. 3, at step 301, the UE 210 sets Max_NAT_Interval equal to the greater of SIM1_NAT_Interval and SIM2_NAT_Interval. In this example, SIM1_NAT_Interval (60 seconds) is greater than SIM2_NAT_Interval (20 seconds), so the UE 210 sets Max_NAT_Interval to be equal to SIM1_NAT_Interval. At step 303, when the IMS APN of the SIM 211 is idle for Max_NAT_Interval, the UE 210 triggers a partial call from the SIM 212 to the SIM 211. That is, the IMS module 240 sends a SIP Invite message from the MDN 222 to the MDN 221.

At step 305, the UE 210 determines if the IMS module 240 can receive the incoming test call SIP Invite message from the MDN 222 to the MDN 221. If the IMS module 240 receives the incoming test call SIP Invite message, this indicates that the NAT entry on the WIFI AP router 250 is still valid (the NAT entry is not removed after Max_NAT_Interval) and the UE 210 can still receive incoming IMS traffic. This means that Max_NAT_Interval is a valid NAT interval, and the process 300 moves to step 309. However, if the IMS module 240 cannot receive the incoming test call SIP Invite message, this indicates that the NAT entry on the WIFI AP router 250 could have been removed after Max_NAT_Interval and the UE 210 cannot receive incoming IMS traffic. This indicates that Max_NAT_Interval is not an effective NAT interval. Of course, sometimes the SIP Invite message may be lost due to other unexpected reasons. To confirm (or to ensure accuracy), the UE 210 can optionally send a second test call SIP Invite message from the MDN 222 to the MDN 221 after the IMS APN of the SIM 211 is idle for Max_NAT_Interval. If the second test call SIP invite message is also lost, the UE 210 can confirm Max_NAT_Interval is not an effective NAT interval. In such a case, the process 300 moves to step 307.

At step 307, the UE 210 reduces Max_NAT_Interval by a delta amount (Max_NAT_Interval=Max_NAT_Interval−delta), and the process 300 returns to step 303 where the UE 210 triggers another partial call from the SIM 212 to the SIM 211. Steps 303, 305, and 307 can be repeated until the UE 210 determines a valid Max_NAT_Interval for the WIFI AP router 250. At step 309, after the UE 210 determines the optimized NAT interval, the UE 210 sets the NAT keep-alive interval on both SIMs 211-212 to be the optimized Max_NAT_Interval.

Although FIG. 3 illustrates one example of a process 300 for real-time lightweight optimization of a NAT keep-alive interval for a dual-SIM mobile device, various changes may be made to FIG. 3. For example, while shown as a specific sequence of operations, various operations shown in FIG. 3 could overlap, occur in parallel, occur in a different order, or occur any number of times. Also, the specific operations shown in FIG. 3 are examples only, and other techniques could be used to perform each of the operations shown in FIG. 3.

Figure 4:
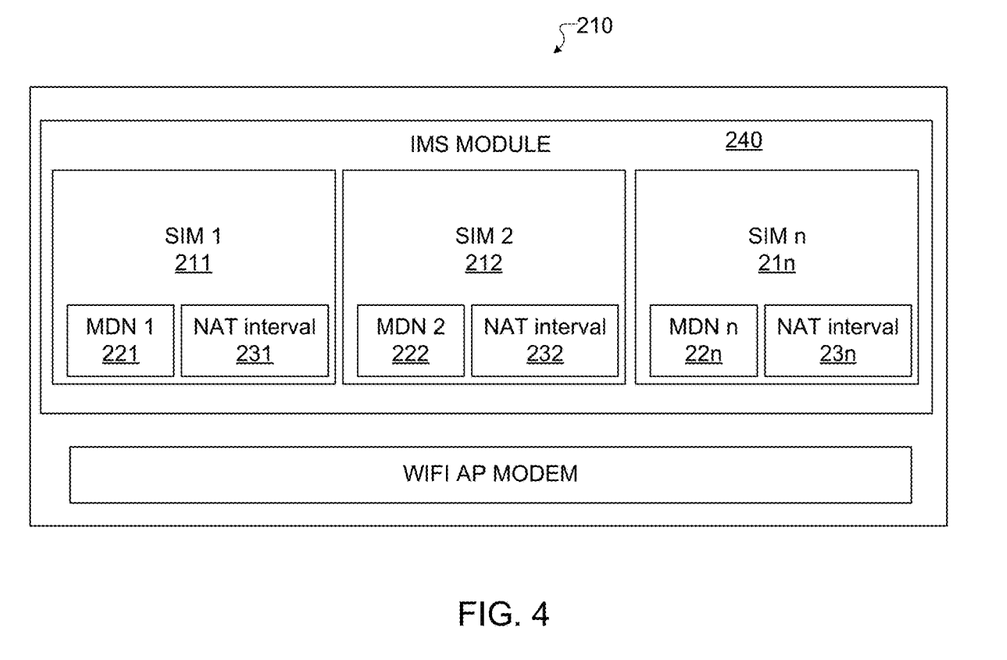
FIG. 4 illustrates an example configuration of a multi-SIM device according to this disclosure.

FIG. 4 illustrates an example configuration of a multi-SIM device according to this disclosure. More specifically, FIG. 4 illustrates an example embodiment of the UE 210 that has been expanded to include more than two SIMs. For ease of explanation, the UE 210 is described as involving some of the components of the network configuration 100 shown in FIG. 1. However, the UE 210 could be implemented using any other suitable device(s) in any other suitable system(s).

As shown in FIG. 4, the UE 210 is a multi-SIM device that includes multiple SIMs 211, 212, . . . , 21n. Each SIM 211, 212, . . . , 21n is associated with an MDN 221, 222, 22n, respectively. The UE 210 supports VoWIFI and includes a common ePDG/IMS module 240 to handle the VoWIFI calls for the SIMs 211, 212, . . . , 21n. Each of the SIMs 211, 212, . . . , 21n is associated with a NAT interval 231, 232, 23n, respectively. The UE 210 can use a similar approach as the one described above to identify a maximum NAT interval suitable for all SIMs 211, 212, . . . , 21n.

Although FIG. 4 illustrates one example configuration of a multi-SIM device, various changes may be made to FIG. 4. For example, the UE 210 could represent any multi-SIM mobile device with three or more SIMs. Also, the UE 210 could include any number of each component in any suitable arrangement. In general, computing and communication devices come in a wide variety of configurations, and FIG. 4 does not limit the scope of this disclosure to any particular configuration.

Figure 5:
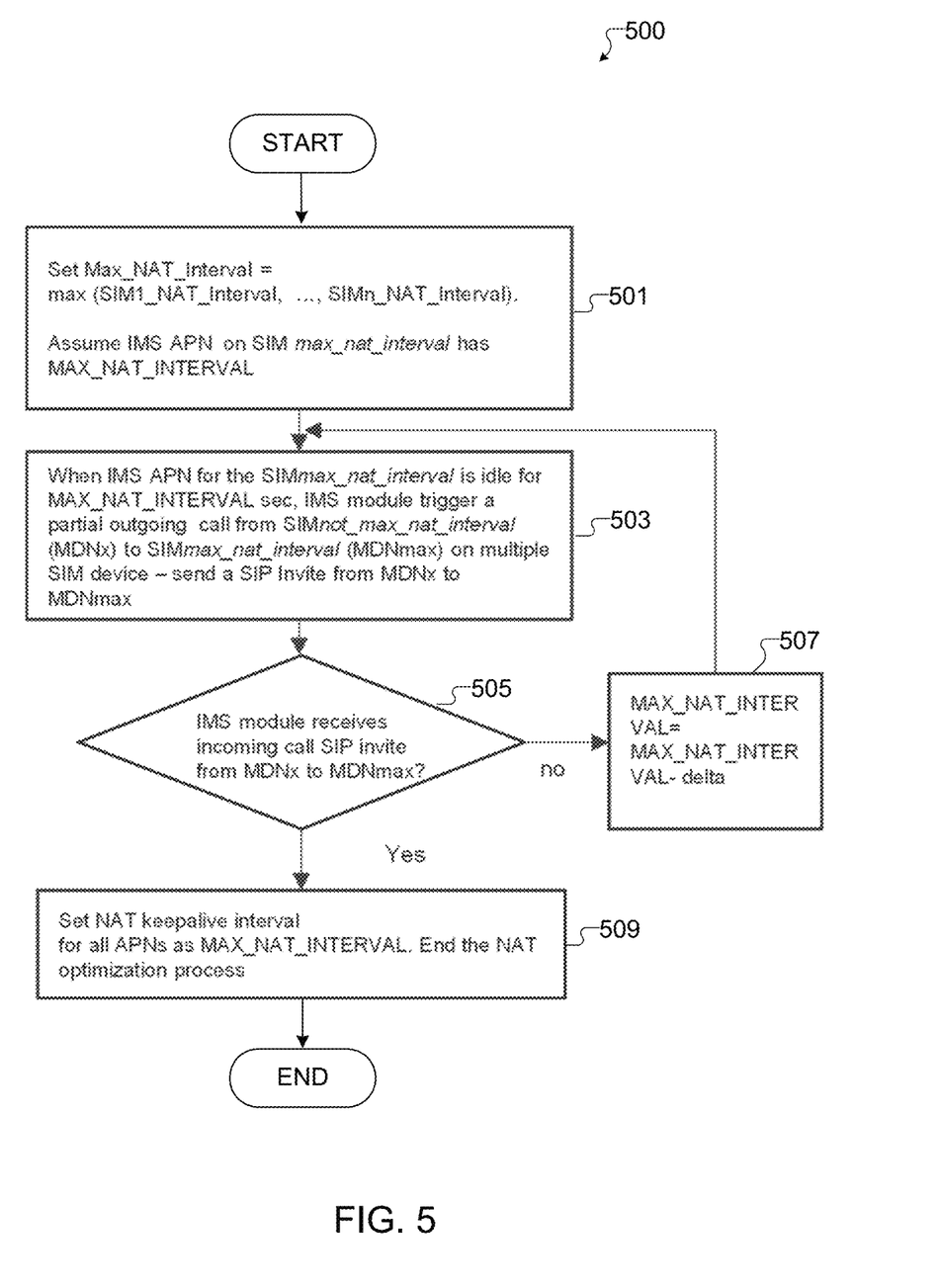
FIG. 5 illustrates an example process for real-time lightweight optimization of a NAT keep-alive interval for a multi-SIM mobile device according to this disclosure.

FIG. 5 illustrates an example process 500 for real-time lightweight optimization of a NAT keep-alive interval for a multi-SIM mobile device according to this disclosure. For ease of explanation, the process 500 shown in FIG. 5 is described as involving the UE 210 shown in FIG. 4, which can include the electronic device 101 shown in FIG. 1. However, the process 500 shown in FIG. 5 could be used with any other suitable electronic device and in any suitable system.

In the process 500, it is assumed that the UE 210 is a multi-SIM device and supports VoWIFI on more than two SIMs 211, 212, . . . , 21n. It is also assumed that at least some of the NAT intervals 231-23n have different values. The following labels are used for the process 500:

SIM1_NAT_Interval: NAT interval 231 for SIM 211
SIM2_NAT_Interval: NAT interval 232 for SIM 212
. . .
SIMn_NAT_Interval: NAT interval 23n for SIM 21n
SIMmax_nat_interval: SIM 211-21n having maximum NAT interval 231-23n.
SIMnot_max_nat_interval: SIM 211-21n whose NAT interval 231-23n is less than the maximum.

As shown in FIG. 5, at step 501, the UE 210 sets Max_NAT_Interval equal to the maximum of the NAT intervals 231-23n (Max_NAT_Interval=max (SIM1_NAT_Interval, . . . , SIMn_NAT_Interval). At step 503, when the IMS APN of SIMmax_nat_interval is idle for Max_NAT_Interval, the UE triggers a partial call from SIMnot_max_nat_interval to SIMmax_nat_interval. For example, the IMS module 240 may send a SIP Invite message from the MDN of SIMnot_max_nat_interval to the MDN of SIMmax_nat_interval. At step 505, the UE 210 determines if the IMS module 240 can receive the incoming test call SIP Invite message. If the IMS module 240 receives the incoming test call SIP Invite message, this indicates that the NAT entry on the WIFI AP router 250 is still valid (the NAT entry is not removed after Max_NAT_Interval) and UE 210 can still receive incoming IMS traffic for SIMmax_nat_interval. This means that Max_NAT_Interval is a valid NAT interval, and the process 500 moves to step 509. However, if the IMS module 240 cannot receive the incoming test call SIP Invite message, this indicates that the NAT entry on the WIFI AP router 250 could have been removed after Max_NAT_Interval and the UE 210 cannot receive incoming IMS traffic. This indicates that Max_NAT_Interval is not an effective NAT interval, and the process 500 moves to step 507.

At step 507, the UE 210 reduces Max_NAT_Interval by a delta amount (Max_NAT_Interval=Max_NAT_Interval−delta), and the process 500 returns to step 503 where the UE 210 triggers another partial call from SIMnot_max_nat_interval to SIMmax_nat_interval. Steps 503, 505, and 507 can be repeated until the UE 210 determines a valid Max_NAT_Interval for the WIFI AP router 250. At step 509, after the UE 210 determines the optimized NAT interval, the UE 210 sets the NAT keep-alive interval on all SIMs 211-21n to be the optimized Max_NAT_Interval.

Although FIG. 5 illustrates one example of a process 500 for real-time lightweight optimization of a NAT keep-alive interval for a multi-SIM mobile device, various changes may be made to FIG. 5. For example, while shown as a specific sequence of operations, various operations shown in FIG. 5 could overlap, occur in parallel, occur in a different order, or occur any number of times. Also, the specific operations shown in FIG. 5 are examples only, and other techniques could be used to perform each of the operations shown in FIG. 5.

It should be noted that the operations and functions shown in at least one of FIGS. 3 and 5 can be implemented in an electronic device 101 in any suitable manner. For example, in some embodiments, the operations shown in at least one of FIGS. 3 and 5 can be implemented or supported using one or more software applications or other software instructions that are executed by the processor 120 of the electronic device 101. In other embodiments, at least some of the operations shown in at least one of FIGS. 3 and 5 can be implemented or supported using dedicated hardware components. In general, the operations shown in each of FIGS. 3 and 5 can be performed using any suitable hardware or any suitable combination of hardware and software/firmware instructions.

Figure 6:
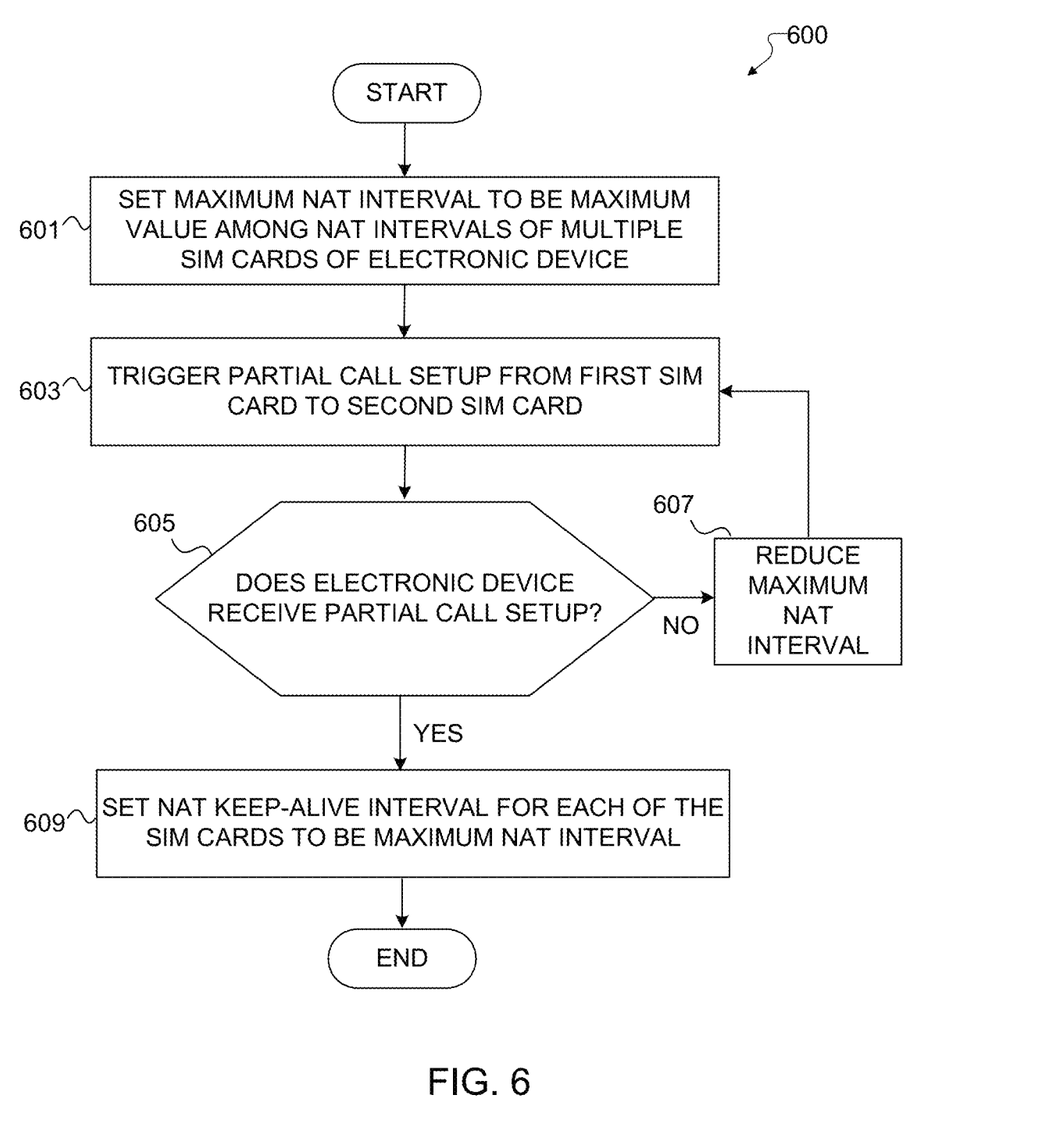
FIG. 6 illustrates an example method for real-time lightweight optimization of a NAT keep-alive interval for a multi-SIM mobile device according to this disclosure.

FIG. 6 illustrates an example method 600 for real-time lightweight optimization of a NAT keep-alive interval for a multi-SIM mobile device according to this disclosure. For ease of explanation, the method 600 shown in FIG. 6 is described as involving the performance of the process 300 shown in FIG. 3 or the process 500 shown in FIG. 5 using the UE 210 shown in FIG. 2 or 4. However, the method 600 shown in FIG. 6 could be used with any suitable electronic device and in any suitable system.

As shown in FIG. 6, at step 601, a maximum NAT interval is set to be a maximum value among NAT intervals associated with multiple SIM cards of an electronic device. This could include, for example, the UE 210 setting a maximum NAT interval 235 equal to the largest among NAT intervals 231-23n for the SIMs 211-21n. At step 603, a partial call setup is triggered from a first SIM card of the multiple SIM cards to a second SIM card of the multiple SIM cards. This could include, for example, the UE 210 triggering a partial call from the SIM 212 to the SIM 211. In particular, the IMS module 240 could send a SIP Invite message from the MDN 222 to the MDN 221, although other types of messages may be used.

At step 605, it is determined whether the electronic device receives the partial call setup. This could include, for example, the UE 210 determining if the IMS module 240 receives the incoming test call SIP Invite message from the MDN 222 to the MDN 221. If the electronic device does not receive the partial call setup, the method 600 moves to step 607. At step 607, the maximum NAT interval is reduced by a specified amount. This could include, for example, the UE 210 reducing the maximum NAT interval 235 by a delta amount. The method 600 then returns to step 603.

If the electronic device receives the partial call setup at step 605, the method 600 moves to step 609. At step 609, a NAT keep-alive interval for each of the multiple SIM cards is set to be equal to the maximum NAT interval. This could include, for example, the UE 210 setting the NAT intervals 231-23n on the SIMs 211-21n to be the optimized maximum NAT interval 235.

Although FIG. 6 illustrates one example of a method 600 for real-time lightweight optimization of a NAT keep-alive interval for a multi-SIM mobile device, various changes may be made to FIG. 6. For example, while shown as a series of steps, various steps in FIG. 6 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   setting, using at least one processor of an electronic device that includes multiple subscriber identity module (SIM) cards, a maximum network address translation (NAT) interval to be a maximum value among NAT keep-alive intervals associated with the multiple SIM cards;
   triggering, using the at least one processor, a partial call setup from a first SIM card of the multiple SIM cards to a second SIM card of the multiple SIM cards;
   determining, using the at least one processor, whether the electronic device receives the partial call setup; and
   in response to determining that the electronic device receives the partial call setup, setting, using the at least one processor, the NAT keep-alive interval for each of the multiple SIM cards to be equal to the maximum NAT interval.

2. The method of claim 1, further comprising: in response to determining that the electronic device does not receive the partial call setup: reducing the maximum NAT interval by a specified amount; triggering a second partial call setup from the first SIM card to the second SIM card; and determining whether the electronic device receives the second partial call setup.

3. The method of claim 1, wherein determining, using the at least one processor, whether the electronic device receives the partial call setup comprises: determining, using the at least one processor, whether an Internet Protocol (IP) multimedia system (IMS) module of the electronic device receives the partial call setup.

4. The method of claim 3, wherein:
   the NAT keep-alive interval of the second SIM card is the maximum NAT interval; and
   the partial call setup is triggered when an IMS access point name (APN) connection on the second SIM card is in an idle state for the maximum NAT interval.

5. The method of claim 1, wherein the partial call setup comprises a Session Initiation Protocol (SIP) Invite message from a mobile directory number (MDN) of the first SIM card to an MDN of the second SIM card.

6. The method of claim 1, wherein the electronic device is connected to a WIFI access point and is operating in a voice over WIFI (VoWIFI) mode.

7. The method of claim 1, wherein the first SIM card and the second SIM card are associated with different network carriers.

8. An electronic device comprising:
   at least one memory configured to store instructions; and
   at least one processing device configured when executing the instructions to:
      set a maximum network address translation (NAT) interval to be a maximum value among NAT keep-alive intervals associated with multiple subscriber identity module (SIM) cards of the electronic device;
      trigger a partial call setup from a first SIM card of the multiple SIM cards to a second SIM card of the multiple SIM cards;
      determine whether the electronic device receives the partial call setup; and
      in response to determining that the electronic device receives the partial call setup, set the NAT keep-alive interval for each of the multiple SIM cards to be equal to the maximum NAT interval.

9. The electronic device of claim 8, wherein the at least one processing device is further configured, in response to determining that the electronic device does not receive the partial call setup, to:
   reduce the maximum NAT interval by a specified amount;
   trigger a second partial call setup from the first SIM card to the second SIM card; and
   determine whether the electronic device receives the second partial call setup.

10. The electronic device of claim 8, wherein, to determine whether the electronic device receives the partial call setup, the at least one processing device is configured to determine whether an Internet Protocol (IP) multimedia system (IMS) module of the electronic device receives the partial call setup.

11. The electronic device of claim 10, wherein:
   the NAT keep-alive interval of the second SIM card is the maximum NAT interval; and
   the at least one processing device is configured to trigger the partial call setup when an IMS access point name (APN) connection on the second SIM card is in an idle state for the maximum NAT interval.

12. The electronic device of claim 8, wherein the partial call setup comprises a Session Initiation Protocol (SIP) Invite message from a mobile directory number (MDN) of the first SIM card to an MDN of the second SIM card.

13. The electronic device of claim 8, wherein the electronic device is configured to connect to a WIFI access point and is configured to operate in a voice over WIFI (VoWIFI) mode.

14. The electronic device of claim 8, wherein the first SIM card and the second SIM card are associated with different network carriers.

15. A non-transitory machine-readable medium containing instructions that when executed cause at least one processor of an electronic device to:
   set a maximum network address translation (NAT) interval to be a maximum value among NAT keep-alive intervals associated with multiple subscriber identity module (SIM) cards of the electronic device;
   trigger a partial call setup from a first SIM card of the multiple SIM cards to a second SIM card of the multiple SIM cards;
   determine whether the electronic device receives the partial call setup; and
   in response to determining that the electronic device receives the partial call setup, set the NAT keep-alive interval for each of the multiple SIM cards to be equal to the maximum NAT interval.

16. The non-transitory machine-readable medium of claim 15, wherein the instructions when executed further cause the at least one processor, in response to determining that the electronic device does not receive the partial call setup, to:
   reduce the maximum NAT interval by a specified amount;
   trigger a second partial call setup from the first SIM card to the second SIM card; and
   determine whether the electronic device receives the second partial call setup.

17. The non-transitory machine-readable medium of claim 15, wherein the instructions that cause the at least one processor to determine whether the electronic device receives the partial call setup comprise:
   instructions that cause the at least one processor to determine whether an Internet Protocol (IP) multimedia system (IMS) module of the electronic device receives the partial call setup.

18. The non-transitory machine-readable medium of claim 15, wherein:
   the NAT keep-alive interval of the second SIM card is the maximum NAT interval; and
   the instructions cause the at least one processor to trigger the partial call setup when an IMS access point name (APN) connection on the second SIM card is in an idle state for the maximum NAT interval.

19. The non-transitory machine-readable medium of claim 15, wherein the partial call setup comprises a Session Initiation Protocol (SIP) Invite message from a mobile directory number (MDN) of the first SIM card to an MDN of the second SIM card.

20. The non-transitory machine-readable medium of claim 15, wherein the electronic device is configured to connect to a WIFI access point and is configured to operate in a voice over WIFI (VoWIFI) mode.

* * * * *